F. WOLF.

Apparatus for Vignetting Photographic Negatives.

No. 74,654. Patented Feb. 18, 1868.

United States Patent Office.

F. WOLF, OF PHILADELPHIA, PENNSYLVANIA.

Letters Patent No. 74,654, dated February 18, 1868; antedated February 5, 1868.

---

APPARATUS FOR VIGNETTING PHOTOGRAPHIC NEGATIVES.

---

The Schedule referred to in these Letters Patent and making part of the same.

---

TO ALL WHOM IT MAY CONCERN:

Be it known that I, F. WOLF, of No. 340 North Thirteenth street, in Philadelphia, in the county of Philadelphia, and State of Pennsylvania, have invented a new and useful Improvement in Photographic Cameras; and I do hereby declare that the following is a full, clear, and exact description thereof, which will enable those skilled in the art to make and use the same, reference being had to the accompanying drawing, forming part of this specification, in which drawing—

Similar letters of reference in both views indicate corresponding parts.

Figure 1:
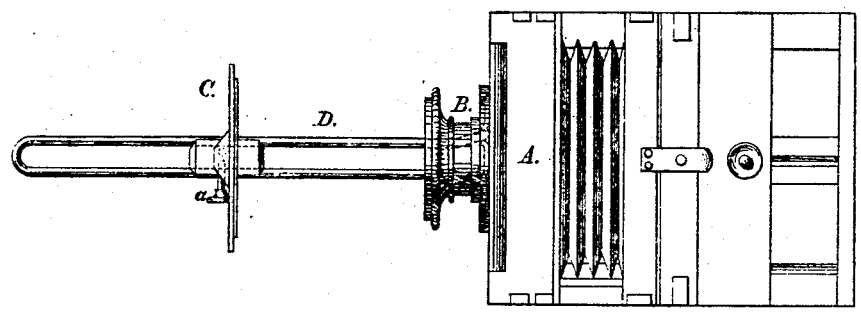
Figure 1 represents a plan or top view of this invention.
Figure 2:
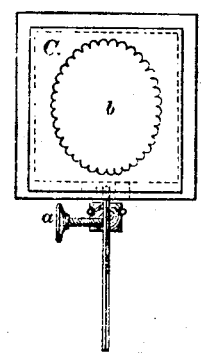
Figure 2 is a transverse section of the same, taken in the plane indicated by the line $x\ x$, fig. 1.

This invention consists in the arrangement of a screen, perforated with a hole of oval or any other suitable form or shape, and edged with mica, or other transparent or semi-transparent material, in combination with suitable arms, on which said screen can be moved back and forth, and with a photographic camera, in such a manner that, by adjusting said screen at the proper distance from the lens-tube, and between the lens and the object to be taken, a vignette, with the proper shade, can be obtained directly from the object, and the operation of producing vignettes is materially simplified.

A represents a photographic camera, which is provided with a lens-tube, B, in the ordinary manner. Between the lens and the object from which a picture is to be taken, I place the screen C, which is adjustable on arms D. These arms may either be secured to the camera, or they may be attached to a separate support, and the screen C may be fastened to said arms, or to a suitable support, by a set-screw, $a$, or by any other desirable means. The screen C is perforated with a hole or aperture, $b$, which may be oval, as shown, or in any other suitable form or shape. The edge of this hole is scalloped, or provided with a large number of thin, radiating points, and this edge is made of mica, or other transparent or semi-transparent material. By this scalloped transparent or semi-transparent edge, the required shade is produced round the picture to be taken, and directly on the glass plate containing the negative, and, by adjusting the screen C in the proper position between the camera and the object from which the picture is to be taken, negatives for vignettes are obtained, from which pictures can be produced equal to those now taken by printing from ordinary photographic pictures.

The operation of producing vignettes is thereby materially simplified, and such pictures can be made in the same time, and for the same price, as ordinary photographic pictures.

What I claim as new, and desire to secure by Letters Patent, is—

The screen C, provided with a suitable hole, the edge of which is made of a suitable transparent or semi-transparent material, in combination with supporting-arms D, and with a photographic camera A, substantially as and for the purpose set forth.

F. WOLF.

Witnesses:
  JACOB WOLF,
  CHARLES WOLF.